(12) United States Patent
Ai et al.

(10) Patent No.: US 12,096,263 B2
(45) Date of Patent: Sep. 17, 2024

(54) METHOD AND APPARATUS FOR FAST SERVING CELL ACTIVATION

(71) Applicant: ZTE CORPORATION, Guangdong (CN)

(72) Inventors: Jianxun Ai, Shenzhen (CN); He Huang, Shenzhen (CN); Jing Liu, Shenzhen (CN); Xiaojuan Shi, Shenzhen (CN); Nan Zhang, Shenzhen (CN); Mengjie Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 391 days.

(21) Appl. No.: 17/486,494

(22) Filed: Sep. 27, 2021

(65) Prior Publication Data
US 2022/0086676 A1    Mar. 17, 2022

Related U.S. Application Data

(63) Continuation of application No. PCT/CN2019/080239, filed on Mar. 28, 2019.

(51) Int. Cl.
*H04W 72/04* (2023.01)
*H04W 24/10* (2009.01)

(52) U.S. Cl.
CPC ........... *H04W 24/10* (2013.01); *H04W 72/04* (2013.01)

(58) Field of Classification Search
None
See application file for complete search history.

(56) References Cited

U.S. PATENT DOCUMENTS

| | | |
|---|---|---|
| 2019/0058517 A1 | 2/2019 | Kang et al. |
| 2019/0081679 A1 | 3/2019 | Davydov et al. |
| 2019/0356444 A1* | 11/2019 | Noh ................. H04L 5/0023 |
| 2022/0014337 A1* | 1/2022 | Ouchi .............. H04W 74/0808 |

FOREIGN PATENT DOCUMENTS

| | | |
|---|---|---|
| EP | 3 100 575 A1 | 12/2016 |
| WO | WO-2011/085230 A2 | 7/2011 |
| WO | WO-2011/085230 A3 | 7/2011 |
| WO | WO-2018/174664 A1 | 9/2018 |

OTHER PUBLICATIONS

International Search Report and Written Opinion for PCT Appl. No. PCT/CN2019/080239, mailed Jan. 3, 2020 (11 pages).
Zte et al.: "Dormant State for SCells" 3GPP TSG-RAN WG2 Meeting#105; R2-1900803; Mar. 1, 2019; Athens, Greece (7 pages).
(Continued)

*Primary Examiner* — Minh Trang T Nguyen
(74) *Attorney, Agent, or Firm* — Foley & Lardner LLP

(57) ABSTRACT

Method, systems and devices for direct and active channel state information, CSI, report configuration are provided. The method comprises: receiving a message containing a CSI report configuration for a serving cell at a user equipment, UE; and activating the CSI report configuration for the serving cell by the UE when a predetermined event occurs.

12 Claims, 10 Drawing Sheets

(56) References Cited

OTHER PUBLICATIONS

3rd Generation Partnership Project, "Technical Specification Group Radio Access Network; NR; Radio Resource Control (RRC) protocol specification (Release 15)" 3GPP TS 38.331, Mar. 25, 2019, pp. 202-215, V15.5.0, Mobile Competence Centre; 650, Route Des Lucioles ; F-06921 Sophia-Antipolis Cedex; France (14 pages).
Extended European Search Report for EP Appl. No. 19921505.4, dated May 20, 2022 (14 pages).
Samsung, "How to handle DL/UL resource activated/deactivated by MAC CEs upon BWP/SCell deactivation" 3GPP TSG-RAN WG2 Meeting #105, R2-1901010, Feb. 25, 2019, Athens, Greece (2 pages).
ZTE Corporation et al., "Dormant State for SCells" 3GPP-TSG RAN WG2 Meeting #105, r2-1900803, Feb. 25, 2019, Athens, Greece (7 pages).
ZTE et al., "Remaining issues on SCell activation/deactivation" 3GPP TSG-RAN WG2 Meeting #105, R2-1900796, Feb. 25, 2019, Athens, Greece (5 pages).
3rd Generation Partnership Project; Technical Specification Group Radio Access Network; NR; Multiplexing and channel coding (Release 15), 3GPP TS 38.212 V15.5.0 (Mar. 2019), 101 pages.
Communication pursuant to Article 94(3) EPC for EP Appl. No. 19921505.4, dated Apr. 18, 2024 (6 pages).

* cited by examiner

METHOD AND APPARATUS FOR FAST SERVING CELL ACTIVATION

CROSS-REFERENCE TO RELATED APPLICATION

This application claims the benefit of priority under 35 U.S.C. § 120 as a continuation of PCT Patent Application No. PCT/CN2019/080239, filed on Mar. 28, 2019, the disclosure of which is incorporated herein by reference in its entirety.

TECHNICAL FIELD

The present disclosure relates to the communication field, more particularly to methods and apparatuses for fast serving cell activation.

BACKGROUND

Mobile telecommunication technologies are moving the world towards an increasingly connected and networked society. In comparison with the existing wireless networks, next generation systems and wireless communication techniques will need to support a much wider range of use-case characteristics and provide a more complex and sophisticated range of access requirements and flexibility. Developing from LTE and LTE Advanced (LTE-A), the 5th generation of wireless system (5G) is required to support higher data-rates, large number of connections, ultra-low latency, high reliability and other emerging business needs.

Dual Connectivity (DC) and Carrier Aggregation (CA) are introduced in the 3GPP Release 15 NR (new radio) standard (3GPP TS 38.331 V15.4.0) to boost data rates.

In Carrier Aggregation (CA), two or more serving cells are aggregated as a cell group (CG). A user equipment (UE) may simultaneously receive or transmit on one or multiple serving cells depending on its capabilities.

In Dual Connectivity (DC) operation, a UE in RRC CONNECTED state is configured with two radio links to utilize radio resources provided by two distinct schedulers, located in two different base stations connected via a non-ideal backhaul and providing either E-UTRA, i.e. if the node is an ng-eNB, or NR access, i.e. if the node is a gNB.

Thus, a UE can be configured with a master cell group (MCG) and a secondary cell group (SCG).

A serving cell in a cell group can be a PCell (primary cell of MCG), PSCell (primary cell of SCG), and SCell (secondary cell). A SCell can be in an activated state, a deactivated state or a dormant state. A SCell can be transited to an activated state by a MAC CE (SCell activation MAC CE), or be configured as activated by a RRC message.

However, currently no prior art solutions provide method(s) for fast serving cell activation sufficient for the 5G standard. Thus, there is a need to provide methods and apparatuses with improved serving cell activation.

SUMMARY

This document relates to methods, systems, and devices for fast serving cell activation.

The present invention is defined by the features of the independent claims. The dependent claims relate to preferred embodiments of the present invention.

A method for direct and active channel state information, CSI, report configuration is provided according to an embodiment of the present disclosure, which comprises: receiving a message containing a CSI report configuration for a serving cell at a user equipment, UE, wherein the type of the CSI report configuration is semi-persistent reporting; and activating the CSI report configuration for the serving cell by the UE when a predetermined event occurs.

According to a preferred embodiment the CSI report configuration is identified by an explicit indicator or by an information element, IE, in the message (a configuration ID).

According to a preferred embodiment the predetermined event is any one of: receiving a MAC CE at the UE activating a bandwidth part, BWP, for the serving cell; the UE waking up according to a discontinuous reception, DRX, configuration for the serving cell or a cell group to which the serving cell belongs; and the UE waking up according to a received wake up signal, which is used to indicate that the UE wakes up according to a DRX configuration for the serving cell or the cell group to which the serving cell belongs.

According to a preferred embodiment activating the CSI report configuration is automatic upon occurrence of the predetermined event.

According to a preferred embodiment the CSI report configuration further comprises reporting on PUCCH or reporting on PUSCH.

The terms "automatic" and "automatically" as used herein refers to an action, e.g. activating the CSI report configuration, that is triggered by a particular event, e.g. one of the foregoing described events, without any further event, e.g. receiving MAC CE or DCI, for triggering said action occurring after said particular event.

According to a preferred embodiment time domain and frequency domain resource of the PUCCH or PUSCH for CSI reporting is included in the message.

A method for direct and active channel state information, CSI, report configuration is provided according to an embodiment of the present disclosure, which comprises: sending a message containing a CSI report configuration for a serving cell to a user equipment, UE, for activating the CSI report configuration for the serving cell by the UE when a predetermined event occurs, wherein the type of the CSI report configuration is semi-persistent reporting.

According to a preferred embodiment the CSI report configuration is identified by an explicit indicator or by an information element, IE, in the message (a configuration ID).

According to a preferred embodiment the predetermined event is any one of: sending a MAC CE to the UE activating a bandwidth part, BWP, for the serving cell; sending a wake up signal to the UE to waking up the UE according to the wake up signal, which is used to indicate that the UE wakes up according to a DRX configuration for the serving cell or the cell group to which the serving cell belongs.

According to a preferred embodiment activating the CSI report configuration is automatic upon occurrence of the predetermined event.

According to a preferred embodiment the CSI report configuration further comprises reporting on PUCCH or reporting on PUSCH.

According to a preferred embodiment the time domain and frequency domain resource of PUCCH or PUSCH for CSI reporting is included in the message.

A method for direct and active channel state information, CSI, report configuration is provided according to an embodiment of the present disclosure, which comprises the method according to any one of the foregoing described methods for direct and active CSI report configuration.

A method for applying channel state information, CSI, report configuration is provided according to an embodiment of the present disclosure, which comprises: receiving a radio resource control, RRC, message at a user equipment, UE, wherein the RRC message triggers a RACH procedure; and applying CSI report configuration when during the RACH procedure a timing advanced, TA, command MAC CE.

A method for applying channel state information, CSI, report configuration is provided according to an embodiment of the present disclosure, which comprises: receiving a radio resource control, RRC, message at a user equipment, UE, wherein the RRC message triggers a RACH procedure; and applying CSI report configuration when during the RACH procedure a downlink control information, DCI, is received at the UE.

According to a preferred embodiment the DCI is addressed to the UE's cell radio network temporary identifier, C-RNTI.

According to a preferred embodiment the contention based RACH procedure or contention free RACH procedure is triggered by a primary cell change, a primary secondary cell change, or a secondary cell group addition.

A method for applying channel state information, CSI, report configuration is provided according to an embodiment of the present disclosure, which comprises: sending a radio resource control, RRC, message to a user equipment, UE, wherein the RRC message triggers any one of a contention based RACH procedure and contention free RACH procedure; and sending a timing advanced, TA, command MAC CE.

A method for applying channel state information, CSI, report configuration is provided according to an embodiment of the present disclosure, which comprises: sending a radio resource control, RRC, message to a user equipment, UE, wherein the RRC message triggers a RACH procedure; and sending a downlink control information, DCI, to the UE for applying CSI report configuration.

According to a preferred embodiment the DCI is addressed to the UE's cell radio network temporary identifier, C-RNTI.

According to a preferred embodiment the contention based RACH procedure or contention free RACH procedure is triggered by a primary cell change, a primary secondary cell change, or a secondary cell group addition.

A method for applying channel state information, CSI, report configuration is provided according to an embodiment of the present disclosure, which comprises the method according to any one of the forgoing described methods for applying CSI report configuration.

A method for stop applying channel state information, CSI, report configuration is provided according to an embodiment of the present disclosure, which comprises: receiving a MAC control element, CE, to stop applying the CSI report configuration by a user equipment, UE; and stop applying the CSI report configuration upon reception of the MAC CE at the UE.

According to a preferred embodiment the MAC CE comprises an indicator to stop applying the CSI report configuration by the UE.

According to a preferred embodiment after applying the CSI report configuration, the method comprises a further step of applying a further CSI report configuration when the UE receives a MAC CE to apply the further CSI report configuration.

According to a preferred embodiment after applying the CSI report configuration, the UE sends a CSI report for a serving cell to be activated to a base station, BS.

According to a preferred embodiment after applying the further CSI report configuration, the UE sends a CSI report for a serving cell to be activated to a base station, BS.

According to a preferred embodiment the MAC CE to stop applying the CSI report configuration is received by the UE after reception of the CSI report.

A method for stop applying channel state information, CSI, report configuration is provided according to an embodiment of the present disclosure, which comprises: receiving a downlink control information, DCI, to stop applying the CSI report configuration by a user equipment, UE; and stop applying the CSI report configuration upon reception of the DCI at the UE.

According to a preferred embodiment the DCI comprises an indicator to stop applying the CSI report configuration by the UE.

According to a preferred embodiment the type of the CSI report configuration is periodic or semi-persistent.

According to a preferred embodiment after applying the CSI report configuration, the method comprises a further step of applying a further CSI report configuration when the UE receives a DCI to apply the further CSI report configuration.

According to a preferred embodiment after applying the CSI report configuration, the UE sends a CSI report for a serving cell to be activated to a base station, BS.

According to a preferred embodiment after applying the further CSI report configuration, the UE sends a CSI report for a serving cell to be activated to a base station, BS.

According to a preferred embodiment the DCI to stop applying the CSI report configuration is received by the UE after reception of the CSI report.

A method for stop applying channel state information, CSI, report configuration is provided according to an embodiment of the present disclosure, which comprises: sending a MAC control element, CE, to stop applying the CSI report configuration to a user equipment, UE, for stop applying the CSI report configuration upon reception of the MAC CE at the UE.

According to a preferred embodiment the MAC CE comprises an indicator to stop applying the CSI report configuration by the UE.

According to a preferred embodiment after applying the CSI report configuration at the UE, the method comprises a further step of sending a MAC CE to apply a further CSI report configuration.

A method for stop applying channel state information, CSI, report configuration is provided according to an embodiment of the present disclosure, which comprises: sending a downlink control information, DCI, to stop applying the CSI report configuration to a user equipment, UE, for stop applying the CSI report configuration upon reception of the DCI at the UE.

According to a preferred embodiment the DCI comprises an indicator to stop applying the CSI report configuration by the UE.

According to a preferred embodiment the type of the CSI report configuration is periodic or semi-persistent.

According to a preferred embodiment the method further comprises receiving a CSI report for a serving cell to be activated from the UE at a base station, BS.

According to a preferred embodiment the MAC CE to stop applying the CSI report configuration is send upon reception of the CSI report.

According to a preferred embodiment the DCI to stop applying the CSI report configuration is send upon reception of the CSI report.

A method for stop applying channel state information, CSI, report configuration is provided according to an embodiment of the present disclosure, which comprises any one of the foregoing described methods for stop applying CSI report configuration.

A method for early measurement configuration is provided according to an embodiment of the present disclosure, which comprises: receiving, by a UE, an indication to include at least one current serving cell of a cell group, which is configured to the UE when the UE is in a RRC CONNECTED state, in a measurement cell list; including of the at least one current serving cell of the cell group, which is configured to the UE when the UE is in a RRC CONNECTED state, in a measurement cell list, in accordance with the indication; and performing early measurement configuration based at least in part on the measurement cell list when the UE is in a RRC IDLE or RRC INACTIVE state.

According to a preferred embodiment including the at least one current serving cell in the measurement cell list is initiated by receiving an indication from a base station, BS.

According to a preferred embodiment including the at least one current serving cell in the measurement cell list is initiated by a predefined rule.

According to a preferred embodiment receiving the indication from the BS comprises receiving a RRC message including an indicator.

According to a preferred embodiment receiving the indication from the BS comprises receiving system information transmitted in the serving cell which the UE camps on.

According to a preferred embodiment the indication comprises an indication of a specific RAT type serving cell which is to be included in the measurement cell list.

According to a preferred embodiment the indication comprises an indication of an E-UTRA serving cell which is to be included in the measurement cell list.

According to a preferred embodiment the serving cells which are to be included in the measurement cell list meet a condition, wherein the condition is at least one of: the serving cell is in an activated state when the UE receives a RRC release message; the serving cell is in a dormant state when the UE receives a RRC release message; the serving cell is in a deactivated state when the UE receives a RRC release message; the carrier frequency of the serving cell is configured as a carrier frequency for early measurement.

A method for early measurement configuration is provided according to an embodiment of the present disclosure, which comprises: sending an indication from a base station, BS, for including, by a user equipment, UE, at least one current serving cell of a cell group, which is configured to the UE when the UE is in a RRC CONNECTED state, in a measurement cell list and for performing early measurement configuration based at least in part on the measurement cell list when the UE is in a RRC IDLE or RRC INACTIVE state.

According to a preferred embodiment sending the indication from the BS comprises sending a RRC message including an indicator.

According to a preferred embodiment sending the indication from the BS comprises sending system information transmitted in the serving cell which the UE camps on.

According to a preferred embodiment the indication comprises an indication of a specific RAT type serving cell which is to be included in the measurement cell list.

According to a preferred embodiment the indication comprises an indication of an E-UTRA serving cell which is to be included in the measurement cell list.

According to a preferred embodiment the serving cells which are to be included in the measurement cell list meet a condition, wherein the condition is at least one of: the serving cell is in an activated state when the UE receives a RRC release message; the serving cell is in a dormant state when the UE receives a RRC release message; the serving cell is in a deactivated state when the UE receives a RRC release message; the carrier frequency of the serving cell is configured as a carrier frequency for early measurement.

According to a preferred embodiment the cell group comprises at least one of a master cell group, MCG, and a secondary cell group, SCG.

A method for early measurement configuration is provided according to an embodiment of the present disclosure, which comprises any one of the foregoing described methods for early measurement configuration.

A method for configuration of user equipment, UE, with individual measurement duration timers for performing early measurements is provided according to an embodiment of the present disclosure, which comprises: receiving, at the UE, at least one of: a measurement duration timer parameter for inter-RAT measurements, a measurement duration timer parameter for inter-frequency measurements, a measurement duration timer parameter for NR frequency measurements, and a measurement duration timer parameter for E-UTRA frequency measurements; and configuring the UE according to the received measurement duration timer parameter(s). The duration timer parameter(s) define individual measurement duration parameters.

According to a preferred embodiment the method further comprises starting measurement duration timer according to the received measurement duration timer parameter(s) and performing the respective early measurements while the measurement duration timer is running.

According to a preferred embodiment performing the respective early measurements comprises measuring frequencies whose RAT type is different to the RAT type of the UE's current serving cell in case of inter-RAT measurements, frequencies different to the frequencies of the UE's current serving cell in case of inter-frequency measurements, and frequencies whose RAT type is NR in case of measurement on NR frequency, and frequencies whose RAT type is E-UTRA in case of measurement on E-UTRA frequency.

A method for configuration of user equipment, UE, with individual measurement duration timers for performing early measurements is provided according to an embodiment of the present disclosure, which comprises: sending, to the UE, at least one of: a measurement duration timer parameter for inter-RAT measurements, a measurement duration timer parameter for inter-frequency measurements, measurement duration timer parameter for NR frequency measurements, and a measurement duration timer parameter for E-UTRA frequency measurements for configuring the UE according to the received measurement duration timer parameter(s). The duration timer parameter(s) define individual measurement duration parameters.

A method for configuration of user equipment, UE, with individual measurement duration timers for performing early measurements is provided according to an embodiment of the present disclosure, which comprises any one of the foregoing described methods for configuration of UE with individual measurement duration timers for performing early measurements.

A method for time-frequency synchronization signaling in SCell activation is provided according to an embodiment of the present disclosure, which comprises: receiving a message configuring a tracking reference signal, TRS, resource for SCell activation; and configuring TRS for SCell activation as the time frequency synchronization signal.

According to a preferred embodiment the message is a RRC reconfiguration message.

According to a preferred embodiment the message configures at least one of a periodic TRS resource, a semi-persistent TRS resource, and an aperiodic TRS resource.

A method for time-frequency synchronization signaling in SCell activation is provided according to an embodiment of the present disclosure, which comprises: sending a message configuring a tracking reference signal, TRS, resource for SCell activation for configuring TRS for SCell activation as the time frequency synchronization signal.

According to a preferred embodiment the message is a RRC reconfiguration message.

According to a preferred embodiment the message configures at least one of a periodic TRS resource, a semi-persistent TRS resource, and an aperiodic TRS resource.

A method for time-frequency synchronization signaling in SCell activation is provided according to an embodiment of the present disclosure, which comprises any of the foregoing described methods for time-frequency synchronization signaling in SCell activation.

A method for fast serving cell activation is provided according to an embodiment of the present disclosure, which comprises any of the foregoing described methods.

An apparatus for direct and active channel state information, CSI, report configuration is provided according to an embodiment of the present disclosure, which comprises: a receiver configured to receive a message containing the CSI report configuration for a serving cell; and a processor configured to activate the CSI report configuration for the serving cell when a predetermined event occurs, wherein the type of the CSI report configuration is semi-persistent reporting.

An apparatus for direct and active channel state information, CSI, report configuration is provided according to an embodiment of the present disclosure, which comprises: a transmitter configured to transmit a message containing the CSI report configuration for a serving cell for activating the CSI report configuration for the serving cell when a predetermined event occurs at a user equipment, UE, wherein the type of the CSI report configuration is semi-persistent reporting.

A system for direct and active channel state information, CSI, report configuration is provided according to an embodiment of the present disclosure, which comprises any one of the foregoing described apparatuses for direct and active CSI report configuration.

An apparatus for applying channel state information, CSI, report configuration is provided according to an embodiment of the present disclosure, which comprises: a receiver configured to receive a radio resource control, RRC, message at the apparatus, wherein the RRC message triggers a RACH procedure; and a processor configured to apply CSI report configuration when during the RACH procedure a timing advanced, TA, command MAC CE is received at the apparatus.

An apparatus for applying channel state information, CSI, report configuration is provided according to an embodiment of the present disclosure, which comprises: a receiver configured to receive a radio resource control, RRC, message at the apparatus, wherein the RRC message triggers a RACH procedure; and a processor configured to apply CSI report configuration when during the RACH procedure a downlink control information, DCI, is received at the apparatus.

An apparatus for applying channel state information, CSI, report configuration is provided according to an embodiment of the present disclosure, which comprises: a transmitter configured to transmit a radio resource control, RRC, message to a user equipment, UE, wherein the RRC message triggers a RACH procedure for applying CSI report configuration when during the RACH procedure a timing advanced, TA, command MAC CE is received at the UE.

An apparatus for applying channel state information, CSI, report configuration is provided according to an embodiment of the present disclosure, which comprises: a transmitter configured to transmit a radio resource control, RRC, message to a user equipment, UE, wherein the RRC message triggers a RACH procedure for applying CSI report configuration when during the RACH procedure a downlink control information, DCI, is received at the apparatus.

A system for applying channel state information, CSI, report configuration is provided according to an embodiment of the present disclosure, which comprises any one of the foregoing described apparatuses for applying CSI report configuration.

An apparatus for stop applying channel state information, CSI, report configuration is provided according to an embodiment of the present disclosure, which comprises: a receiver configured to receive a MAC control element, CE, to stop applying the CSI report configuration; and a processor configured to stop applying the CSI report configuration upon receipt of the MAC CE.

An apparatus for stop applying channel state information, CSI, report configuration, the apparatus comprising: a receiver configured to receive a downlink control information, DCI, to stop applying the CSI report configuration; and a processor configured to stop applying the CSI report configuration upon receipt of the DCI.

An apparatus for stop applying channel state information, CSI, report configuration is provided according to an embodiment of the present disclosure, which comprises: a transmitter configured to transmit a MAC control element, CE, to stop applying the CSI report configuration for stop applying the CSI report configuration upon reception of the MAC CE at a user equipment, UE.

An apparatus for stop applying channel state information, CSI, report configuration is provided according to an embodiment of the present disclosure, which comprises: a transmitter configured to transmit a downlink control information, DCI, to stop applying the CSI report configuration for stop applying the CSI report configuration upon reception of the DCI at a user equipment, UE.

A system for stop applying channel state information, CSI, report configuration is provided according to an embodiment of the present disclosure, which comprises any one of the foregoing described apparatuses for stop applying CSI report configuration.

An apparatus for early measurement configuration is provided according to an embodiment of the present disclosure, which comprises: a receiver configured to receive an indication to include at least one current serving cell of a cell group, which is configured to the apparatus when the apparatus is in a RRC CONNECTED state, in a measurement cell list; and a processor configured to include the at least one current serving cell of the cell group, which is configured to the apparatus when the apparatus is in a RRC CONNECTED state, in a measurement cell list, in accordance with the indication; and to perform early measurement configuration based at least in part on the measurement cell list when the UE is in a RRC IDLE or RRC INACTIVE state.

An apparatus for early measurement configuration is provided according to an embodiment of the present disclosure, which comprises: a transmitter configured to transmit an indication from the apparatus, for including, by a user equipment, UE, at least one current serving cell of a cell group, which is configured to the UE when the UE is in a RRC CONNECTED state, in a measurement cell list and for performing early measurement configuration based at least in part on the measurement cell list when the UE is in a RRC IDLE or RRC INACTIVE state.

A system for early measurement configuration is provided according to an embodiment of the present disclosure, which comprises any one of the foregoing described apparatuses for early measurement configuration.

An apparatus for configuration of user equipment, UE, with individual measurement duration timers for performing early measurements is provided according to an embodiment of the present disclosure, which comprises: a receiver configured to receive at least one of: a measurement duration timer parameter for inter-RAT measurements, a measurement duration timer parameter for inter-frequency measurements, a measurement duration timer parameter for NR frequency measurements, and a measurement duration timer parameter for E-UTRA frequency measurements; and a processor configured to configure the apparatus according to the received measurement duration timer parameter(s). The duration timer parameter(s) define individual measurement duration parameters.

An apparatus for configuration of user equipment, UE, with individual measurement duration timers for performing early measurements is provided according to an embodiment of the present disclosure, which comprises: a transmitter configured to transmit at least one of: a measurement duration timer parameter for inter-RAT measurements, a measurement duration timer parameter for inter-frequency measurements, a measurement duration timer parameter for NR frequency measurements, and a measurement duration timer parameter for E-UTRA frequency measurements for a UE to configure the UE according to the received measurement duration timer parameter(s). The duration timer parameter(s) define individual measurement duration parameters.

A system for configuration of user equipment, UE, with individual measurement duration timers for performing early measurements is provided according to an embodiment of the present disclosure, which comprises any one of the foregoing described apparatuses for configuration of UE with individual measurements duration timers.

An apparatus for time-frequency synchronization signaling in SCell activation is provided according to an embodiment of the present disclosure, which comprises: a receiver configured to receive a message configuring a tracking reference signal, TRS, resource for SCell activation; and a processor configured to configure TRS for SCell activation as the time frequency synchronization signal.

According to a preferred embodiment the message is a RRC reconfiguration message.

According to a preferred embodiment the message configures at least one of a periodic TRS resource, a semi-persistent TRS resource, and an aperiodic TRS resource.

An apparatus for time-frequency synchronization signaling in SCell activation is provided according to an embodiment of the present disclosure, which comprises: a transmitter configured to transmit a message configuring a tracking reference signal, TRS, resource for SCell activation for configuring TRS for SCell activation as the time frequency synchronization signal.

According to a preferred embodiment the message is a RRC reconfiguration message.

According to a preferred embodiment the message configures at least one of a periodic TRS resource, a semi-persistent TRS resource, and an aperiodic TRS resource.

A system for time-frequency synchronization signaling in SCell activation is provided according to an embodiment of the present disclosure, which comprises any of the foregoing described apparatuses for time-frequency synchronization signaling in SCell activation.

An apparatus for fast serving cell activation is provided according to an embodiment of the present disclosure, which comprises: a receiver and a processor configured to implement any of the foregoing described methods that comprise receiving steps.

An apparatus for fast serving cell activation is provided according to an embodiment of the present disclosure, which comprises: a transmitter configured to implement any one of the foregoing described methods that comprise sending steps.

A system for fast serving cell activation is provided according to an embodiment of the present disclosure, which comprises any one of the foregoing described apparatuses for fast serving cell activation.

Any of the foregoing described apparatuses or systems not explicitly described as comprising a processor may be provided with such a processor to implement any of the foregoing described method features.

A storage medium, for storing a program, is provided according to an embodiment of the present disclosure, wherein the program when executed performs any one of the foregoing described methods.

A processor, for executing a program, is provided according to an embodiment of the present disclosure, wherein the program when executed performs any one of the foregoing described methods. A wireless communications apparatus is provided according to an embodiment of the present disclosure, which comprises a processor and a memory, wherein the processor is configured to implement any of the foregoing described methods comprising reception steps.

A base station apparatus is provided according to an embodiment of the present disclosure, which comprises a processor and a memory, wherein the processor is configured to implement any of the foregoing described methods comprising sending steps.

A system is provided according to an embodiment of the present disclosure, which comprises the foregoing described wireless communications apparatus and the base station apparatus.

In other words, a system is provided according to an embodiment of the present disclosure, which is configured to carry out any of the foregoing described methods.

A computer program product is provided according to an embodiment of the present disclosure, which comprises a computer-readable program medium code stored thereupon, the code, when executed by a processor, causing the processor to implement any of the foregoing described methods.

The foregoing embodiments refer to CSI report configuration. It will be appreciated by those skilled in the art that a CSI report and thus also CSI report configuration, inter alia, comprises channel quality information (CQI) report and the respective configuration. Thus, the respective embodiments are also directed to CQI report (configuration), which is either contained in CSI report (configuration) or provided as a separate CQI report (configuration).

In addition, the foregoing described embodiments referring to CSI report configuration may also refer to short period CSI report configuration according to preferred embodiments of the present disclosure.

It will be appreciated by a skilled person that the foregoing described preferred embodiments may be combined with each other thus creating a particular embodiment. That is, the skilled person will consider the preferred embodiments in combination, because the combination of the preferred features is obviously the best way for achieving the technical effects that the invention aims to provide. The combinations of the preferred features can therefore be derived from the whole content of the present invention.

The foregoing described embodiments provide several advantageous over the prior art and solve at least one of the problem among poor serving cell activation, increased power consumption and signaling overhead in the related art.

In particular, the embodiments relating to direct and active channel state information, CSI, report configuration may provide increased speed of CSI report configuration and CSI reporting after wake up of the UE from DRX sleep duration.

In addition, the embodiments relating to applying channel state information, CSI, report configuration may provide short period CSI from the time the message is received and may provide collision free CSI report configuration when a RACH procedure is executed.

Furthermore, the embodiments relating to stop applying channel state information, CSI, report configuration may provide saving of power consumption.

Moreover, the embodiments relating to early measurement configuration may provide saving signaling overhead.

The embodiments relating to configuration of user equipment, UE, with individual measurement duration timers for performing early measurements may provide reduced power consumption of the UE.

These and other advantageous will be apparent to the skilled person from the subsequent description of the exemplary embodiments.

The above and other aspects and their implementations are described in greater detail in the drawings, the descriptions, and the claims.

DETAILED DESCRIPTION

Embodiments of the present disclosure provide a mobile communication network (including but not limited to 5G network), the network structure of the network may include a network-side device (e.g., base station (BS) and a terminal (e.g., user equipment (UE) to be described in more detail below.

It will be understood by those skilled in the art that a CSI report, inter alia, comprises CQI. Thus, when referred to a CQI report it may relate to the CQI report comprised within the respective CSI report.

Embodiment 1

Figure 1:
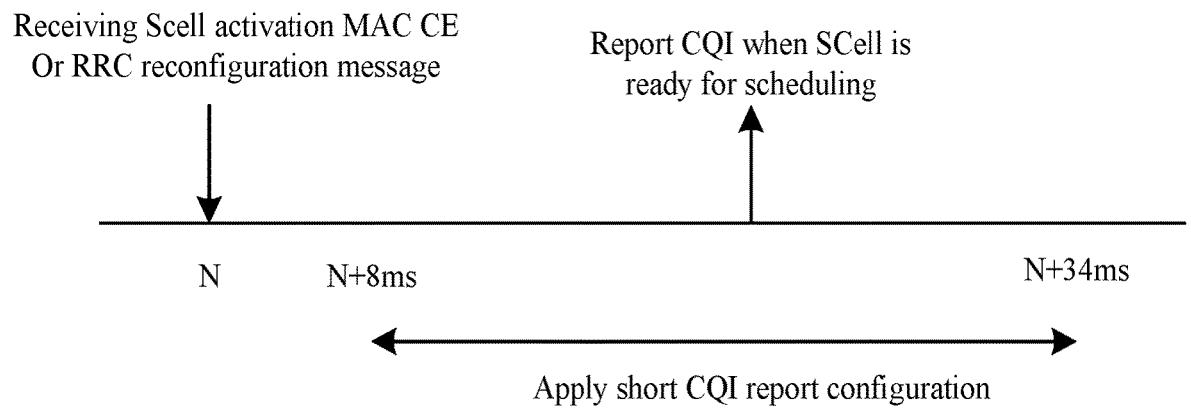
FIG. 1 shows an example of a signaling chart illustrating a short period CSI report configuration according to the prior art.

With reference to FIG. 1, a prior art method for a short period CQI report configuration can be configured to a UE as illustrated. The short period CQI report configuration has a shorter periodicity of uplink resources for CQI report than normal periodic CQI report configuration.

The UE applies the configured short period CQI report configuration when it activates a SCell after it receives a SCell activation MAC CE or a RRC reconfiguration message which configures a SCell in an activated state. The UE can speed up CQI reporting with this shorter period CQI reporting configuration, and the BS can start to schedule on the to be activated SCell with shorter delay after the BS indicates to the UE to activate a SCell.

The UE applies configured short period CQI reporting configuration during a predefined period of time, e.g. in LTE from n+8 (ms) to n+34 (ms), where n is the subframe where the SCell activation MAC CE is received, or the last subframe containing the RRC message which configures a SCell in an activated state.

In prior NR technology, four types of CSI reporting methods are defined. Namely, periodic CSI report on PUCCH, semi persistent CSI report on PUCCH, semi persistent CSI report on PUSCH, and aperiodic CSI report.

With periodic CSI report on PUCCH, the UE reports CSI measurement results on configured periodic PUCCH resources periodically. With semi persistent CSI report on PUCCH or PUSCH, the UE is configured with periodic CSI reporting resources which is activated or deactivated by a MAC CE (for semi persistent CSI report on PUCCH) or a DCI (for semi-persistent CSI report on PUSCH). The BS can also transmit a DCI to trigger an aperiodic CSI report.

Periodic CSI reporting is configured by a RRC message, and the UE applies periodic CSI report configuration when the corresponding serving cell is in an active state. In LTE, short period CQI reporting in the prior art is also a kind of periodic reporting method.

Figure 2:
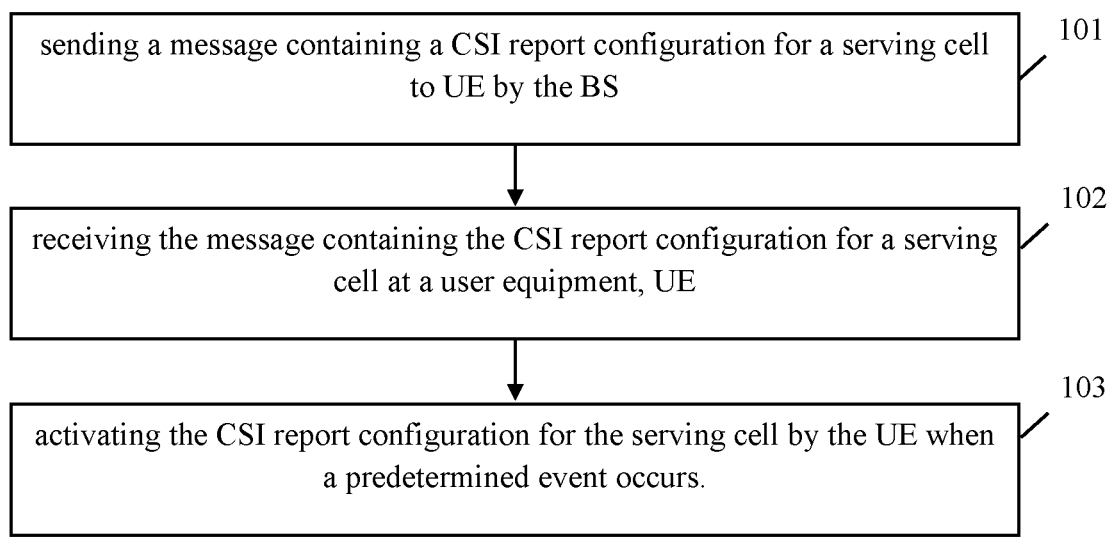
FIG. 2 shows an example of a flow chart of a method for direct and active CSI report configuration according to a preferred embodiment of the present disclosure.

With reference to FIG. 2, the first embodiment of the present disclosure is described. FIG. 2 shows a signaling chart of a method for stop applying CSI report configuration.

At 101 the BS sends a message containing a CSI report configuration for a serving cell to the UE. At 102 the UE receives the message containing the CSI report configuration for a serving cell at the UE. At 103 the UE activates the CSI report configuration for the serving cell by the UE when a predetermined event occurs. The type of the CSI report configuration is semi-persistent reporting.

In more detail, the BS configures a first CSI report configuration for a serving cell via a RRC message to the UE. The BS differentiates the first CSI report configuration from other CSI report configuration by either including an explicit indicator for the first CSI report configuration, or by including an IE which value is the ID of the first CSI report configuration (CSI-ReportConfigId).

The UE activates the first CSI report configuration for the serving cell in following cases:
  Case 1: The UE receives a MAC CE or DCI which activates a BWP for the serving cell.
  Case 2: the UE wakes up according to DRX configuration for the serving cell or the cell group to which the serving cell belongs.
  Case 3: the UE wakes up according to a wake up signal transmitted from the B S, which is used to indicate whether the UE should wake up according to the DRX configuration for the serving cell or the cell group to which the serving cell belongs.

The CSI report configuration further comprises reporting on PUCCH or PUSCH, and the UE activates the CSI report configuration automatically upon the cases listed above, without explicit MAC CE or DCI transmitted from the BS.

When the report configuration type semi-persistent report on PUCCH, time domain and frequency domain resource for CSI report on PUCCH is also configured in the RRC message.

When the report configuration type is semi-persistent report on PUCCH, a BWP ID is included in the RRC message. This BWP ID is used to indicate an uplink BWP which is associated with the PUCCH resources used for this CSI reporting.

When the report configuration type is semi-persistent report on PUSCH, time domain and frequency domain resource for CSI report on PUSCH are also configured in the RRC message.

Optionally, in the RRC message, the BS also indicates the time duration in which the semi persistent CSI report configuration is applied. The BS indicates the time duration by indicating the length of the time duration.

Optionally, in the RRC message, the BS also indicates the time point when UE starts to apply the first CSI report configuration. For example, the indicated time point may be an offset value from when the RRC message is received.

Thus, according to the first embodiment of the present disclosure, it is not necessary to define a different set of short period CSI report configuration which is used to speed up CSI reporting during SCell activation and speed up CSI reporting after wake up from DRX sleep duration.

Instead, by employing existing CSI report configuration definition, this embodiment introduces in a RRC message an indicator to a CSI report configuration, or an IE to indicate which CSI report configuration should be activated/applied during activation procedure of the corresponding serving cell.

Embodiment 2

With reference to FIG. 1 if a serving cell is configured as activated by a RRC message, the UE applies short period CQI report configuration from n+8 ms, where n is the last subframe containing the PDU of the RRC messages.

The problem of this approach is that it does not consider the time needed for RACH procedure which is triggered by the RRC message. If the RRC message triggers a handover (PCell change), or SN change (PSCell change), or SCG addition, a RACH procedure may be triggered to accomplish time alignment.

This situation may occur in following cases:
  Case 1: the RRC message triggers a PCell or PSCell change. Then UE initiates RACH procedure on the new PCell or PSCell.
  Case 2: the RRC message triggers a RACH-less handover. A number of uplink grant in the new PCell or PSCell are configured in the RRC message. The UE transmits an uplink signal using the configured uplink grant in the new PCell or SCell. The BS transmits a contention resolution identity MAC CE to the UE to confirm the RACH-less handover procedure is accomplished.

The problem is that the time used for the RACH procedure and the time used to finish RACH-less handover is uncertain. It could be long due to RACH collision or interference.

If the UE applies short period CSI or CQI report configuration based on the time when UE receives the RRC message, the UE may not have enough time to apply the short period CSI or CQI report configuration, because the RACH procedure or RACH-less procedure occupies the predefined time duration.

Figure 3:
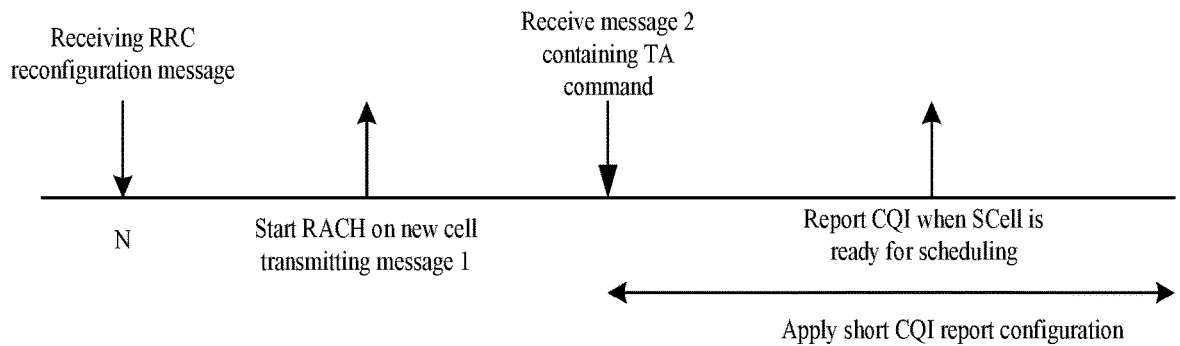
FIG. 3 shows an example of a signaling chart of a method for applying CSI report configuration according to a preferred embodiment of the present disclosure.
Figure 4:
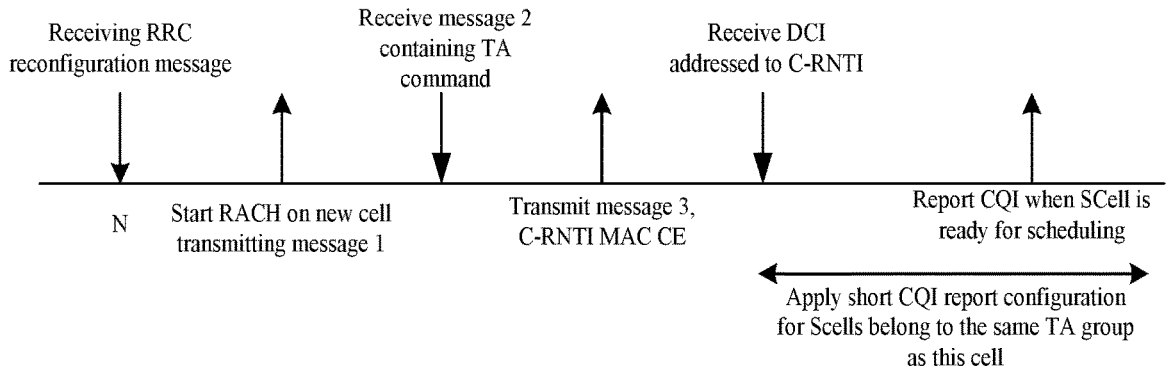
FIG. 4 shows an example of a signaling chart of a method for applying CSI report configuration according to another preferred embodiment of the present disclosure.
Figure 5:
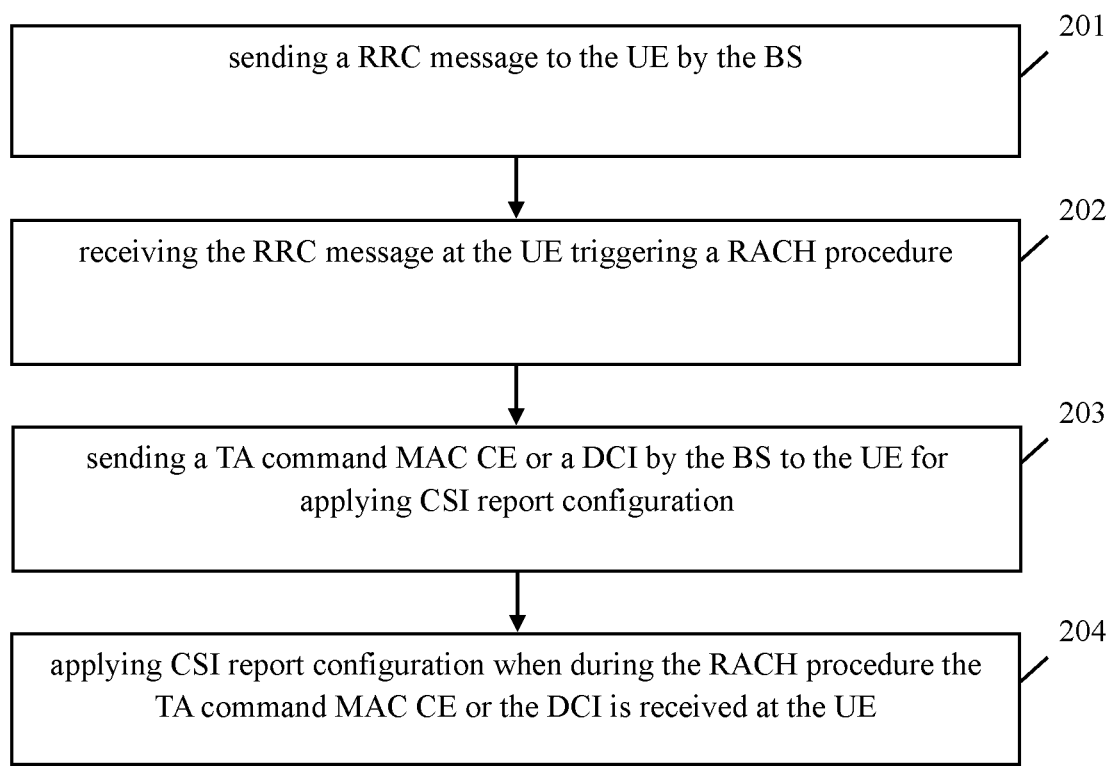
FIG. 5 shows an example of a flow chart of a method for applying CSI report configuration according to FIGS. 3 and 4.

With reference to FIGS. 3 to 5, the second embodiment of the present disclosure is described. FIG. 3 shows a signaling chart of a method for applying CSI report configuration according to a preferred embodiment of the present disclosure. FIG. 4 shows a signaling chart of a method for applying CSI report configuration according to another preferred embodiment of the present disclosure. FIG. 5 shows a flow chart of a method for applying CSI report configuration according to FIGS. 3 and 4.

According to FIG. 5, at 201 the BS sends a RRC message to the UE. At 202 the UE receives the RRC message triggering a RACH procedure, e.g. a contention based RACH procedure or a contention free RACH. At 203 the BS sends a TA command MAC CE (Time Advance command) or a DCI which is addressed to the UE (i.e. the DCI is scrambled with C-RNTI allocated to the UE) At 204 the UE applies CSI report configuration upon reception of the TA command MAC CE or the DCI at the UE.

In more detail, the UE applies the configured short period CSI or CQI report configuration.

For the cases where contention based RACH procedure is triggered, including PCell change, PSCell change, SCG addition, UE performs one of following actions:
  1. When a TA command MAC CE is received during the RACH procedure performed on a first serving cell, for the serving cells which belong to the same TA group as the first serving cell, the UE starts to apply short period CSI or CQI report configuration configured for these serving cells (cf. FIG. 3).
  2. When a DCI addressed to the UE's C-RNTI allocated in a first serving cell is received, for the serving cells which belong to the same TA group as the first serving cell, the UE starts to apply short period CSI or CQI report configuration configured for these serving cells (cf. FIG. 4).

For cases where contention free RACH procedure is triggered, including PCell change, PSCell change, SCG addition, UE performs the following action. When a TA command MAC CE is received during RACH procedure performed on a first serving cell, for the serving cells which belong to the same TA group as the first serving cell, the UE starts to apply short period CSI or CQI report configuration configured for these serving cells (cf. FIG. 3).

Thus, according to the second embodiment of the present disclosure, the UE applies short period CSI or CQI report configuration from the time when a TA command MAC CE is received or contention resolution is accomplished. In comparison with the prior art, the second embodiment of the present disclosure avoids cases where the UE does not have enough time to apply short period CSI or CQI report configuration for serving cells due to uncertainty of RACH procedure delay.

Embodiment 3

In the prior art, if a UE is configured with a short period CSI or CQI report configuration, it applies the short period CSI automatically for the corresponding serving cell within a period of time, i.e. n+8 ms to n+34 ms, where n is the subframe in which the MAC CE used to activate the serving cell, or the subframe which contains the last PDU of a RRC message the configure the serving cell as activated (cf. FIG. 1).

Although with a shorter CSI/CQI report periodicity, more UE power will be consumed, it may still be acceptable because the time duration the UE applies the short period CSI/CQI report configuration is not that long (26 ms).

However in NR, if applying this approach, the time duration in which the UE applies the short period CSI report configuration will be much longer. This is because more delay will be needed to activate a NR serving cell. The delay is used for UE to get ready for PDCCH monitoring, uplink transmission, perform CSI measurement, etc.

Further, this delay may vary dramatically for different frequency band, SMTC configuration of the serving cell and the timing relationship between the next occasion of SSB duration of the serving cell and the time when UE starts to activate the serving cell.

Thus, the prior art approach is no longer optimal regarding UE power consumption.

Actually, the UE applies short period CSI report configuration in order to report CSI as soon as possible when the serving cell to be activated is ready for scheduling and the BS can start to schedule on this serving cell according to the received CSI report. Thus, it is unnecessary to apply the short period CSI report configuration for a long time after the UE has already transmitted a CSI report and data scheduling has begun.

Figure 6:
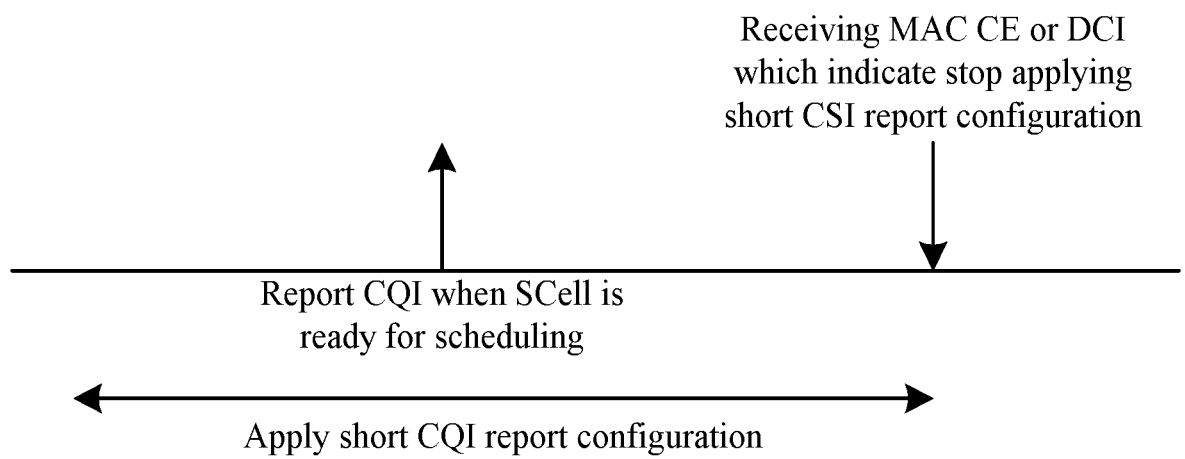
FIG. 6 shows an example of a signaling chart of a method for stop applying CSI report configuration according to a preferred embodiment of the present disclosure.
Figure 7:
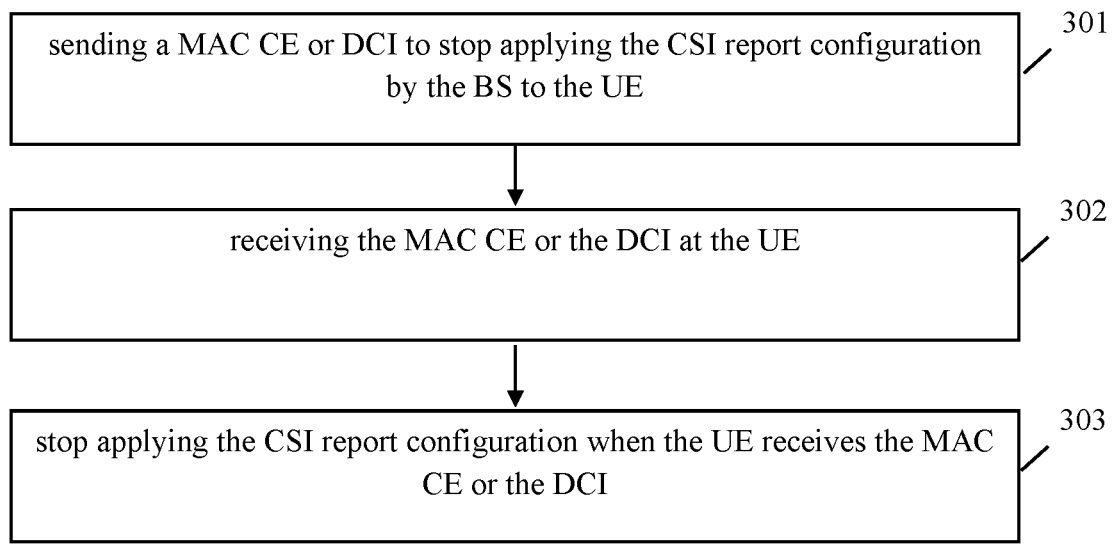
FIG. 7 shows an example of a flow chart of a method for stop applying CSI report configuration according to FIG. 6.

With reference to FIGS. 6 and 7, the third embodiment of the present disclosure is described. FIG. 6 shows a signaling chart of a method for stop applying CSI report configuration according to a preferred embodiment of the present disclosure. FIG. 7 shows a flow chart of a method for stop applying CSI report configuration according to FIG. 6.

According to FIG. 7, at 301 the BS sends a MAC CE or DCI to stop applying the CSI report configuration to the UE. At 302 the UE receives the MAC CE or the DCI. At 303 the UE stops applying the CSI report configuration when the UE receives the MAC CE or the DCI.

In more detail, the third embodiment of the present disclosure aims to optimize the above mentioned drawbacks of the prior art by following methods.

The BS transmits a MAC CE or a DCI to indicate the UE to stop applying a first short period CSI report configuration or first short period CQI report configuration for a serving cell.

On reception of the MAC CE or DCI, the UE stops applying the first CSI report configuration or the first CQI report configuration.

The first short period CSI report configuration is configured for a NR serving cell. The first CSI report configuration can be periodic or semi-persistent report type.

The first short period CQI report configuration is configured for an E-UTRA or LTE serving cell. The first CQI report configuration can be periodic or semi-persistent report type.

The first CSI report configuration or the first CQI report configuration is applied by the UE during a SCell activation procedure, i.e. UE starts to apply the first CSI report configuration or CQI report configuration after it receives a SCell activation MAC CE or a RRC message which configures the SCell in an activated state.

Optionally, the first CSI report configuration or the first CQI report configuration is applied by the UE according to a predefined time duration during the SCell activation procedure.

Optionally, on reception of the MAC CE or DCI, the UE begins to apply a second CSI report configuration or a second CQI report configuration.

The second CSI report configuration or the second CQI report configuration may be periodic report type.

The BS transmits the MAC CE or DCI after it receives a valid CSI report for the serving cell to be activated.

Thus, according to the third embodiment of the present disclosure, the BS can stop applying short period CSI report configuration by explicit signaling. Therefore, unnecessary UE power consumption is saved when the SCell is already being scheduling.

Embodiment 4

In the prior art, a UE can be configured with early measurement configuration when it is released to RRC IDLE state, or when it is suspended to RRC INACTIVE state. UE applies measurements according to configured early measurement configuration when it is in RRC IDLE or RRC INACTIVE state. When the UE is transited to RRC CONNECTED state, it reports the measurement results to the network node (base station, BS). The BS can configure radio resources according to the early measurement results to speed up the configuration.

A UE may be configured with CA or DC when it is in RRC CONNECTED state. When a UE is configured with CA, it is configured with a group serving cells which are aggregated as a cell group. A UE can be configured with DC which means it is configured with more than one cell groups, wherein one is called MCG and another is called SCG.

The early measurement configuration may contain the following information: at least one carrier frequency and at least one of the following parameters corresponding to the at least one carrier frequency: a carrier frequency information, an allowed measurement bandwidth, a measurement cell list, a validity area, frequency band information, a report quantity, and a quality threshold value.

The measurement cell list indicates a list of cells which the UE is requested to measure and report during an early measurement. In some embodiments, the report quantity indicates which measurement quantity the UE is requested to report in an early measurement report. In some embodiments, the quality threshold indicates a quality threshold for reporting an early measurement in a measurement cell. In some embodiments, the first message further comprises a duration for performing an early measurement.

When the UE is released to RRC IDLE state, or when is released to RRC INACTIVE state, it is highly likely that the UE will initiate RRC setup procedure or RRC resume procedure to transit to RRC CONNECTED state from the same location.

In the prior art, if BS wants to configure the UE to perform measurement on these serving cells, it can include the cell ID of these cells in the early measurement configuration which is configured to the UE.

Figure 8:
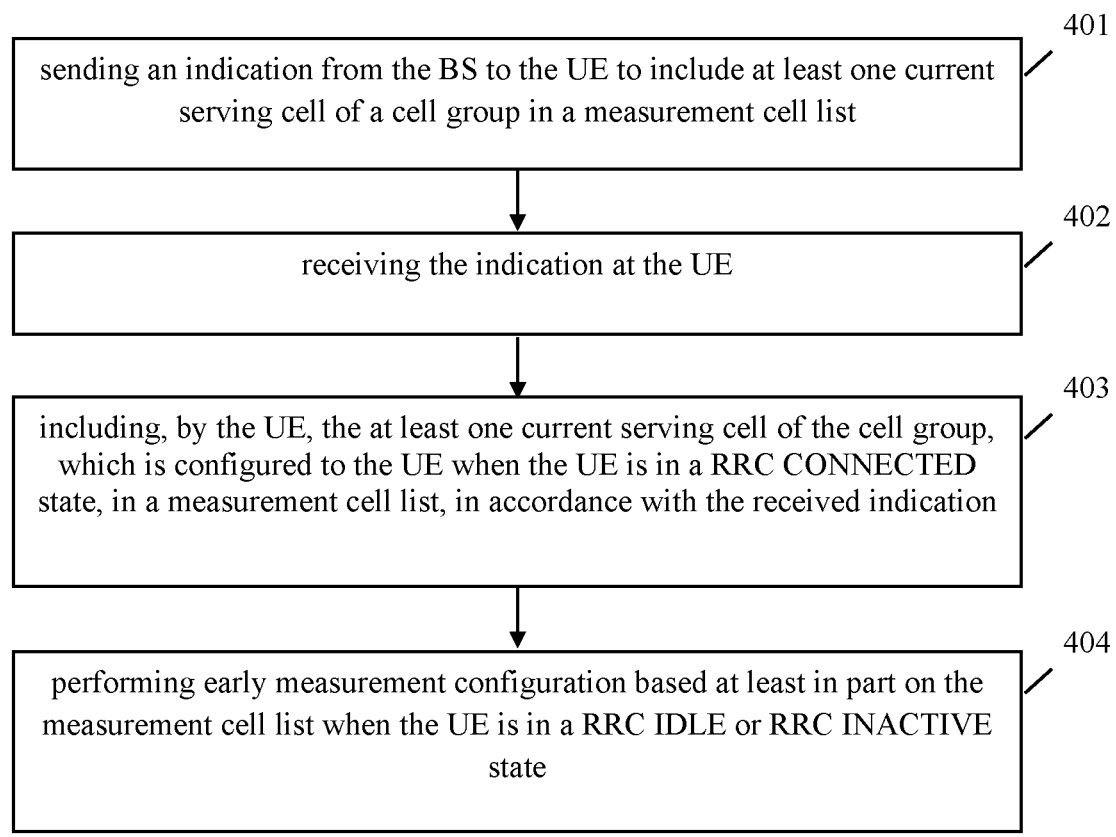
FIG. 8 shows an example of flow chart of a method for early measurement configuration according to a preferred embodiment of the present disclosure.

With reference to FIG. 8, the fourth embodiment of the present disclosure is described. FIG. 8 shows a flow chart of a method for early measurement configuration according to a preferred embodiment of the present disclosure.

According to FIG. 8, at 401 the BS sends an indication to the UE to include at least one current serving cell of a cell group, e.g. a MCG and/or SCG, in a measurement cell list. At 402 the UE receives the indication. At 403 the UE includes of the at least one current serving cell of the cell group, which is configured to the UE when the UE is in a RRC CONNECTED state, in a measurement cell list, in accordance with the received indication. At 404 the UE performs early measurement configuration based at least in part on the measurement cell list when the UE is in a RRC IDLE or RRC INACTIVE state.

Thus, according to the fourth embodiment of the present disclosure, it is beneficial to let UE perform early measurement on the serving cell(s) which is/are configured to the UE when it is in RRC CONNECTED state. When UE is transited to RRC CONNECTED state, it can report the measurement results on these serving cell(s) as soon as possible.

In more detail, the UE includes all or part of serving cells of MCG and/or SCG which are configured to the UE when it is in RRC CONNECTED and before it is transited to RRC IDLE or RRC INACTIVE state as part of the measurement cell list. UE does so according to BS indication or according to predefined rules specified in protocol.

The BS indicates the UE to do so by at least one of following:
1. including indicator in RRC message which is used to release UE to RRC IDLE state or suspend UE to RRC INACTIVE state;
2. including indicator in system information transmitted in the serving cell which UE camps on.

Said indication can be defined as one of following:
3. to include serving cells of MCG as part of measurement cell list of early measurement;
4. to include serving cells of SCG as part of measurement cell list of early measurement;
5. to include serving cells of both MCG and SCG as part of measurement cell list of early measurement;
6. to include serving cells of a specific RAT type, e.g. NR serving cell, or E-UTRA serving cell.

Further, the serving cells which are to be included as part of the measurement cell list may meet at least one of following conditions:
7. the serving cell is in an activated state when the UE receives RRC release message which transit UE to RRC IDLE or RRC INACTIVE state;
8. the serving cell is in dormant state when the UE receives RRC release message which transit UE to RRC IDLE or RRC INACTIVE state;
9. the serving cell is in deactivated state when the UE receives RRC release message which transit UE to RRC IDLE or RRC INACTIVE state;
10. the serving cell is in any state when the UE receives RRC release message which transit UE to RRC IDLE or RRC INACTIVE state;
11. the carrier frequency of the serving cell is configured as a carrier frequency for early measurement. This means those serving cells whose carrier frequency is not included in the early measurement configuration according to the fourth embodiment will not be included as part of a measurement cell list.

The UE includes all or part of its serving cells configured in RRC CONNECTED state in the early measurement configuration, performs early measurement on these cells, and report measurement results for these cells.

The UE includes a serving cell in the measurement cell list of the carrier frequency on which the serving cell is located, or in the measurement cell list of the frequency band on which the serving cell is located. For example, a serving cell is located on carrier frequency f1, then UE includes the serving cell in the measurement cell list configured for the carrier frequency f1.

Thus, according to the fourth embodiment of the present disclosure, signaling overhead is saved if compared to the prior art.

In particular, in the prior art, explicit signaling is needed to configure cell ID of a serving cell in the early measurement configuration carried in the RRC message which is transmitted from BS to UE. In contrast, according to the fourth embodiment of the present disclosure, only one or a few bits are needed to indicate whether UE includes the configured serving cells as part of early measurement.

Since the number of serving cells that can be configured to a UE may be high, the saved signaling size can be significant by employing the solution according to the fourth embodiment of the present disclosure.

Embodiment 5

In the prior art, when a UE is configured to perform early measurement in RRC IDLE state, the UE is configured with a measurement duration timer parameter which is called measIdleDuration. That is, UE starts a timer called T331 according to said parameter when it receives a RRC release message, which configures the UE with early measurement configuration. Before this timer expires, the UE performs measurements according to the configured early measurement configuration.

To support fast MR-DC configuration, the early measurement configuration may contain measurement configuration for more than one RAT types. For example, when a UE is released to RRC IDLE state from a NR cell, it may be configured with early measurement configuration for a list of NR frequency, and a list of E-UTRA frequency. Then when UE is RRC IDLE and before configured measurement duration timer (T331) expires, the UE performs early measurements on both NR frequencies and E-UTRA frequencies. When this measurement duration timer expires, the UE may stop performing measurements and discards the measurement results.

For NR frequencies referred to in the present disclosure see 3GPP TS 38.101 version 15.3.0 Release 15 or the latest version thereof. For E-UTRA frequencies referred to in the present disclosure see 3GPP TS 36.101 version 15.4.0 Release 15 or the latest version thereof. Both documents are incorporated by reference herein in its entirety.

According to the prior art, the UE performs early measurements for intra-RAT frequency and inter-RAT frequency with the same time duration length. This is not beneficial for UE power consumption. To perform inter-RAT measurement, the UE will adjust its receiver. This extra action will increase complexity and cause more power consumption than intra-RAT measurements.

In the prior art, the same problem exists for inter-frequency measurements. When UE is configured with multiple frequencies to perform early measurements, it performs measurements for these frequencies within the same time duration although inter-frequency measurements are much more power consuming than intra-frequency measurements.

Figure 9:
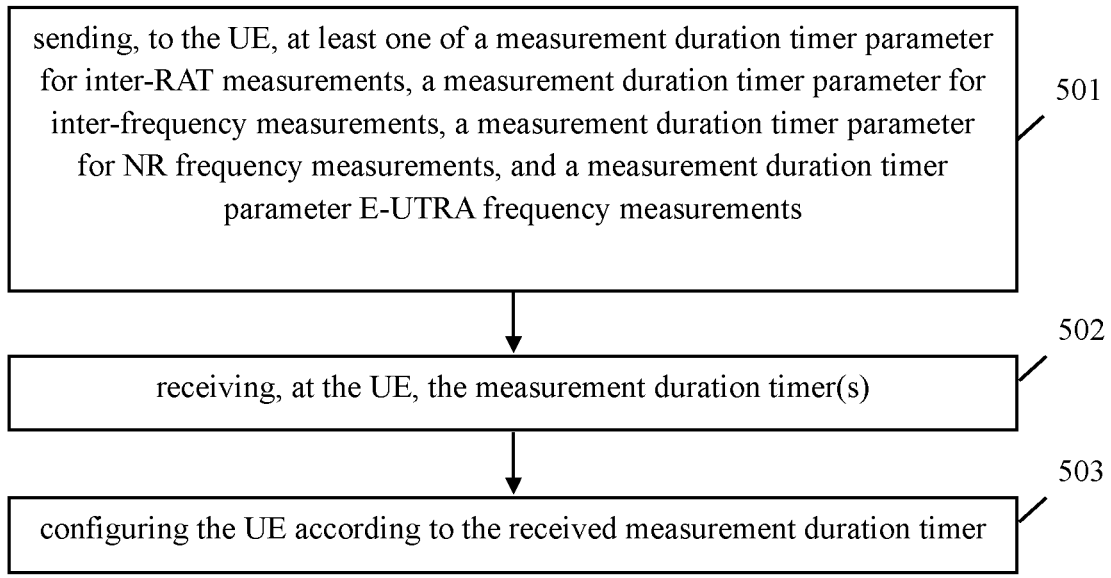
FIG. 9 shows an example of flow chart of a method for configuration of a UE with individual measurement duration timers for performing early measurements according to a preferred embodiment of the present disclosure.

With reference to FIG. 9, the fifth embodiment of the present disclosure is described. FIG. 9 shows a flow chart of a method for configuration of a UE with individual measurement duration timers for performing early measurements according to a preferred embodiment of the present disclosure.

According to FIG. 9, at 501 the BS sends, to the UE, at least one of a measurement duration timer parameter for inter-RAT measurements, a measurement duration timer parameter for inter-frequency measurements, a measurement duration timer parameter for NR frequency measurements, and a measurement duration timer parameter for E-UTRA frequency measurements. At 502 the UE receives the measurement duration timer parameter(s). At 503 the UE configures itself according to the received measurement duration timer parameter(s).

According to the fifth embodiment of the present disclosure, the aforementioned measurement duration timer parameters may be set individually.

In more detail, separate early measurement duration parameters are defined to implement a finer granularity control on UE behavior.

According to embodiments of the present disclosure, UE may be configured by BS with an early measurement duration parameter for inter-RAT measurement. UE starts a timer whose length is set according to this parameter. When this timer is running, UE performs early measurement on the configured frequencies whose RAT type is different to the RAT type of UE's current serving cell.

According to embodiments of the present disclosure, UE may be configured by BS with an early measurement duration parameter for inter-frequency measurement. UE starts a timer whose length is set according to this parameter. When this timer is running, UE performs early measurement on inter-frequency frequencies (the frequency which is of different frequency to that of UE's current serving cell).

According to embodiments of the present disclosure, UE may be configured by BS with early measurement duration parameters for NR frequency and E-UTRA frequency, respectively. UE starts timers whose lengths are set according to these parameters, respectively. When a timer is running, UE performs early measurement on the configured frequencies whose RAT type is the same as the RAT type associated with the timer. For example, when measurement duration timer for NR frequency is running, UE performs early measurement on NR frequencies.

Thus, according to the fifth embodiment of the present disclosure, the BS can control UE behavior of early measurement with fine granularity. To configure different measurement duration timer lengths can optimize power consumption of the UE Embodiment 6

Figure 10:
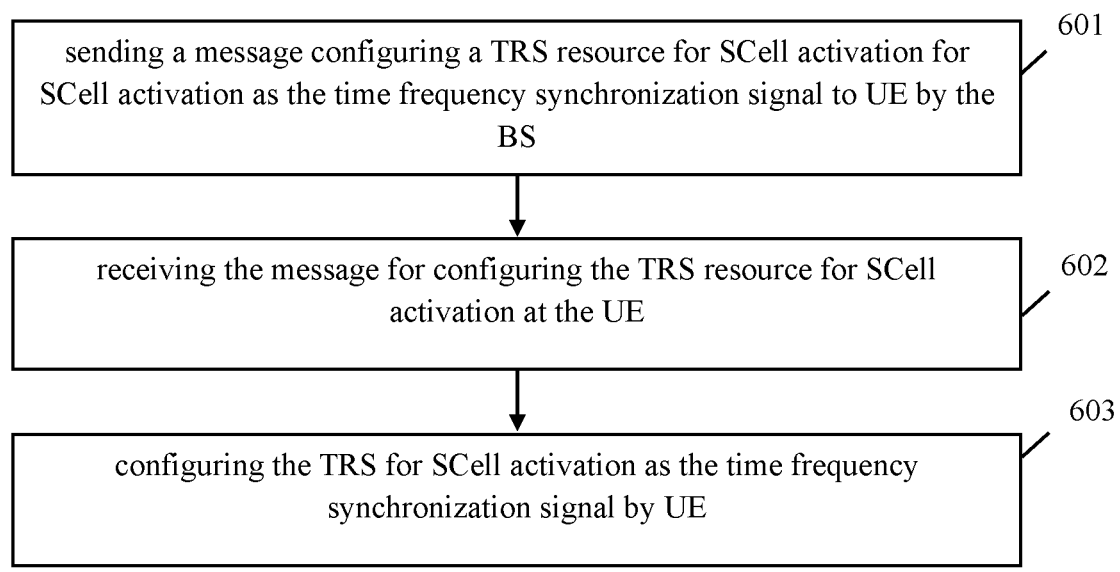
FIG. 10 shows an example of flow chart of a method for time-frequency synchronization signaling in SCell activation according to a preferred embodiment of the present disclosure.
Figure 11:
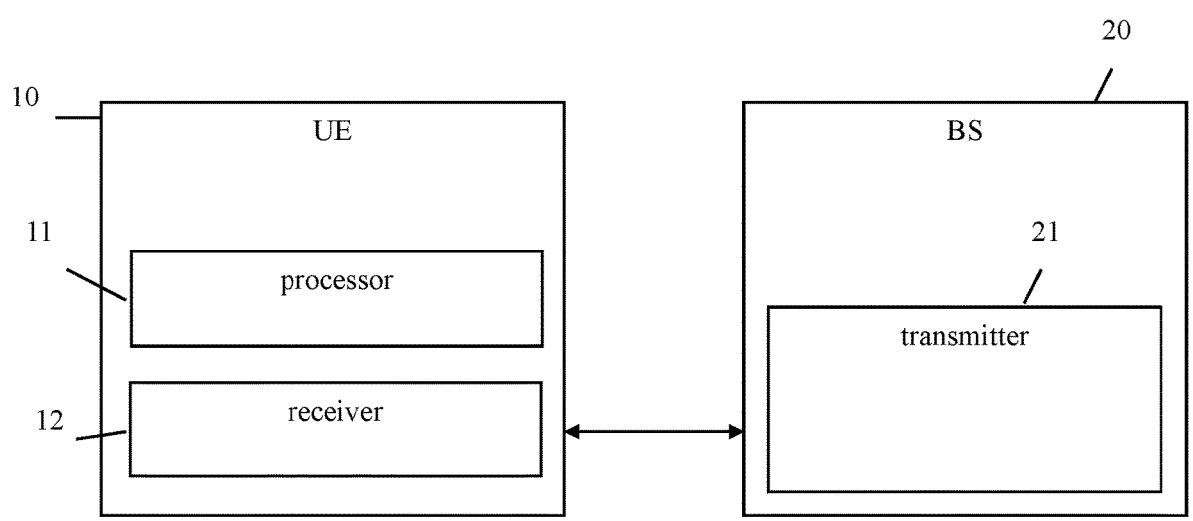
FIG. 11 shows an example of a schematic diagram illustrating the configuration of system including a UE and a BS according to a preferred embodiment of the present disclosure.

With reference to FIG. 10, the sixth embodiment of the present disclosure is described. FIG. 10 shows an example of flow chart of a method for time-frequency synchronization signaling in SCell activation according to a preferred embodiment of the present disclosure.

According to FIG. 10, at 601 the BS sends, to the UE, a message configuring a tracking reference signal, TRS, resource for SCell activation for configuring TRS for SCell activation as the time frequency synchronization signal. At 602 the UE receives the message for configuring the TRS resource for SCell activation. At 603 the UE configures the TRS for SCell activation as the time frequency synchronization signal.

In 3GPP NR system, TRS refers to CSI-RS for tracking, which is configured by higher layer UE specific configuration of a NZP-CSI-RS-ResourceSet configured with higher layer parameter trs-Info.

In more detail, the time-frequency synchronization delay is the main factor affecting SCell activation delay. So reducing the delay for acquiring time-frequency synchronization can significantly reduce the SCell activation delay. Except for SSB, TRS can be configured for each SCell as the time-frequency synchronization signal to acquire faster time-frequency synchronization. There are three alternatives to do so:

Alt. 1: Periodic TRS resource for SCell can be configured via RRC reconfiguration message. When the UE receives MAC CE or RRC signaling for SCell activation, the UE can detect the TRS according to configured offset and periodicity, similar to the process for SSB detection. The BS transmits TRS according to the configured offset and periodicity.

Upon receiving SCell activation command in slot n, the SCell shall be activated no later than in slot n+TTRS+Tothers. TTRS is the time to acquire TRS. The maximum of TTRS is a periodicity of TRS resource. Tothers is the time for other processes related to SCell activation, including HARQ processing or RRC processing time, CSI report processing time, RF re-tuning time, L2 parsing time, AGC adjustment time, and so on.

Alt. 2: Semi-persistent TRS resource for SCell can be configured via RRC reconfiguration message. When the MAC CE is used to activate SCell, the semi-persistent TRS can be triggered via MAC CE or a DCI as well. When the RRC signaling is used to activate SCell, the semi-persistent TRS can be triggered by DCI with receiving RRC signaling, or be triggered by the RRC signaling which indicates the UE to activate configure semi-persistent TRS resource. Then the UE can detect the semi-persistent TRS in slot n1+X, if the TRS is triggered in slot n1. X is the offset according to configuration by RRC message (indicated in periodicityAndOffset), or defined by protocol, which can be considered as TTRS. So upon receiving SCell activation command in slot n, the SCell shall be activated in slot n+X+Tothers.

Alt. 3: Aperiodic TRS resource for SCell can be configured via RRC reconfiguration message. When the RRC signaling is used to activate SCell, the aperiodic TRS can be triggered by DCI with the RRC signaling. When the MAC CE is used to activate SCell, the aperiodic TRS can be triggered by DCI through cross-carrier scheduling, or a MAC CE. Then the UE can detect the aperiodic TRS in slot n1+X, if the TRS is triggered in slot n1. X is the offset configured by RRC message (indicated in aperiodicTriggeringOffset), or defined by protocol, which can be considered as TTRS. Upon receiving SCell activation command in slot n, the SCell shall be activated in slot n+K+X+Tothers. K is the timing for cross-carrier scheduling.

In all alternatives, the BS transmits TRS with a power which has a fix relationship with the power used for transmitting SSB or PDCCH in the same cell or in the same BWP.

Optionally, the BS indicates the transmission power of the TRS to the UE, by indicating the power value, or the power offset to the transmission of SSB or PDCCH of the same cell or same beam.

It will be appreciated by the skilled person that early measurement configuration may also be called idle measurement configuration or inactive measurement configuration.

With reference to FIG. 10, a system in accordance with the present disclosure is illustrated. In particular FIG. 10 shows a schematic diagram illustrating the configuration of a system including a UE 10 and a BS 20 according to embodiments of the present disclosure.

The UE 10 comprises a processor 11 and a receiver 12.

The processor 11 may implement any one of the foregoing described steps of the first to fifth embodiments on the UE 10.

The receiver 12 may receive any of the foregoing described signals of the first to fifth embodiments at the UE 10.

The BS 20 comprises a transmitter, which may transmit any of the foregoing described signals of the first to fifth embodiments from the BS 20.

Thus, the system as illustrated in FIG. 10 may implement any of the foregoing described methods according to the preferred embodiments 1 to 5.

Embodiment 7

When receiving a MAC CE or a RRC reconfiguration message for SCell activation, the UE uses reference SCells' SSB, CSI-RS, or TRS (CSI-RS for tracking) for time-frequency synchronization or AGC adjustment for this SCell.

Optionally, the antenna ports of the SCell to be activated and the reference cell are quasi co-location.

The BS configures reference information for a SCell via a RRC reconfiguration message. The reference information is used to help UE to detect SSB CSI-RS, or TRS in a reference cell for the SCell to be activated.

The reference information includes at least one of following parameters:
- the reference serving cell's cell ID, or the reference cell's index;
- the SSB index mapping between the reference cell and the SCell to be activated to indicate the relationship between the reference SSB index and SSB index for the SCell to be activated;
- the CSI-RS index mapping between the reference cell and the SCell to be activated to indicate the relationship between the reference CSI-RS index and CSI-RS index for the SCell to be activated;
- the TRS index mapping between the reference cell and the SCell to be activated to indicate the relationship between the reference TRS index and TRS index for the SCell to be activated;
- the cell-level power offset between the reference SCell and the SCell to be activated;
- the power offset for SSB beam between the reference SCell and the SCell to be activated;
- the power offset for CSI-RS beam between the reference SCell and the SCell to be activated; and
- the power offset for TRS beam between the reference TRS and the SCell to be activated.

The UE performs time-frequency synchronization by perform the following steps:
- receiving the RRC reconfiguration message including reference information; and
- upon receiving MAC CE or RRC reconfiguration message for SCell activation, detecting the SSB/CSI-RS/TRS in a reference cell according to the reference cell index and SSB/CSI-RS/TRS index mapping between the reference cell and the SCell to be activated.

The UE performs AGC adjustment by perform following steps:
- receiving the RRC reconfiguration message including reference information; and
- upon receiving MAC CE or RRC reconfiguration message for SCell activation, performing the AGC adjustment according to the received cell-level power offset or power offset for SSB/CSI-RS/TRS beam between the reference SCell and the SCell to be activated.

With this embodiment, the UE can use reference signals transmitted in another serving cell to accomplish time-frequency synchronization, or AGC adjustment. This is beneficial in reduction of SCell activation. To activate a SCell, UE has to accomplish time-frequency synchronization and AGC before activating PDCCH monitoring on the SCell to be activate. In prior art, UE performs these functions by reading SSB or other references transmitted on the SCell to be activated. If the period of these reference signals is too long, the SCell activation delay will be large accordingly.

If UE can read reference signals transmitted on other serving cells, the delay may be reduced because UE has more frequency reference signals for time-frequency synchronization and AGC adjustment in effect.

Those skilled in the art will appreciate that the present disclosure is not limited by the description of steps executed by the BS and steps executed by the UE. Rather, both the UE and the BS can be provided as separate units or in combination with each other as a system.

Those skilled in the art will appreciate that all or a portion of the steps described above can be implemented with a program to instruct a related hardware, the program being stored in a computer-readable storage medium such as a read-only memory, a magnetic disk, or an optical disk. In some embodiments, all or part of the steps of the foregoing embodiments may also be implemented by using one or more integrated circuits. Accordingly, each module/unit in the foregoing embodiment may be implemented in the form of hardware or may be implemented in software. The invention is not limited to any specific form of combination of hardware and software.

It is to be understood that various modifications and improvements can be made to the present invention without departing from the scope of the invention. Corresponding changes and modifications are intended to be included within the scope of the appended claims.

Through the description of the above embodiments, those skilled in the art can clearly understand that the method according to the above embodiment can be implemented by means of software plus a necessary general hardware platform, and of course, can also be through hardware, but in many cases the former is a better implementation. Based on such understanding, the technical solution of the present invention, which is essential or contributes to the prior art, may be embodied in the form of a software product stored in a storage medium (such as ROM/RAM, disk, the optical disc), and may include a number of instructions for causing a terminal device (which may be a cell phone, a computer, a server, or a network device, etc.) to perform the methods described in various embodiments of the present invention.

It will be apparent to those skilled in the art that the various modules or steps of the present invention described above can be implemented by a general-purpose computing device, which can be centralized on a single computing device or distributed across a network of multiple computing devices. In some embodiments, they may be implemented in program code executable by a computing device such that they may be stored in a storage device for execution by the computing device and, in some cases, may differ from this. The steps shown or described are performed sequentially, or they are separately fabricated into individual integrated circuit modules, or a plurality of modules or steps thereof are fabricated as a single integrated circuit module. Thus, the invention is not limited to any specific combination of hardware and software.

The above description is only the preferred embodiment of the present invention, and is not intended to limit the present invention, and various modifications and changes can be made to the present invention. Any modifications, equivalent substitutions, improvements, etc. made within the spirit and scope of the present invention are intended to be included within the scope of the present invention.

The invention claimed is:

1. A method for time-frequency synchronization signaling in SCell activation, comprising:
receiving a message for configuring a tracking reference signal (TRS) resource for SCell activation for configuring a TRS for SCell activation as a time-frequency synchronization signal; and
configuring the TRS for SCell activation as the time-frequency synchronization signal,
wherein the TRS resource is an aperiodic TRS resource,
wherein the SCell is activated by a MAC CE and the aperiodic TRS is triggered by the MAC CE, and
wherein the aperiodic TRS is triggered in slot n1 and the aperiodic TRS is detected in slot n1+X, wherein X is an offset configured by a RRC message or defined by a protocol.

2. The method according to claim 1, further comprising:
detecting the aperiodic TRS with a transmission power which has a fix relationship with a transmission power used for transmitting a SSB in the same cell.

3. The method according to claim 1, further comprising:
receiving an indication of a transmission power of the aperiodic TRS, wherein the indication comprises a power value or a power offset to a transmission of a SSB in the same cell.

4. A method for time-frequency synchronization signaling in SCell activation, comprising:
sending a message configuring a tracking reference signal (TRS) resource for SCell activation for configuring a TRS for SCell activation as a time-frequency synchronization signal,
wherein the TRS resource is an aperiodic TRS resource,
wherein the SCell is activated by a MAC CE and the aperiodic TRS is triggered by the MAC CE, and
wherein the aperiodic TRS is triggered in slot n1 and the aperiodic TRS is transmitted in slot n1+X, wherein X is an offset configured by a RRC message or defined by a protocol.

5. The method according to claim 4, further comprising:
transmitting the aperiodic TRS with a transmission power which has a fix relationship with a transmission power used for transmitting a SSB in the same cell.

6. The method according to claim 4, further comprising:
indicating a transmission power of the aperiodic TRS, wherein the indication comprises a power value or a power offset to a transmission of a SSB in the same cell.

7. A wireless communications apparatus comprising a processor and a receiver,
wherein the receiver is configured to receive a message for configuring a tracking reference signal (TRS) resource for SCell activation for configuring a TRS for SCell activation as a time-frequency synchronization signal, and
wherein the processor is configured to configure the TRS for SCell activation as the time-frequency synchronization signal,
wherein the TRS resource is an aperiodic TRS resource,
wherein the SCell is activated by a MAC CE and the aperiodic TRS is triggered by the MAC CE, and
wherein the aperiodic TRS is triggered in slot n1 and the aperiodic TRS is detected in slot n1+X, wherein X is an offset configured by a RRC message or defined by a protocol.

8. The wireless communications apparatus according to claim 7, wherein the receiver is further configured to detect the aperiodic TRS with a transmission power which has a fix relationship with a transmission power used for transmitting a SSB in the same cell.

9. The wireless communications apparatus according to claim 7, wherein the receiver is further configured to receive an indication of a transmission power of the aperiodic TRS, wherein the indication comprises a power value or a power offset to a transmission of a SSB in the same cell.

10. A base station apparatus comprising a transmitter, wherein the transmitter is configured to send a message configuring a tracking reference signal (TRS) resource for SCell activation for configuring a TRS for SCell activation as a time-frequency synchronization signal, wherein the TRS resource is an aperiodic TRS resource, wherein the SCell is activated by a MAC CE and the aperiodic TRS is triggered by a MAC CE, and wherein the aperiodic TRS is triggered in slot n1 and the aperiodic TRS is transmitted in slot n1+X, wherein X is an offset configured by a RRC message or defined by a protocol.

11. The base station apparatus according to claim 10, wherein the transmitter is further configured to transmit the aperiodic TRS with a transmission power which has a fix relationship with a transmission power used for transmitting a SSB in the same cell.

12. The base station apparatus according to claim 10, wherein the transmitter is further configured to indicate a transmission power of the aperiodic TRS, wherein the indication comprises a power value or a power offset to a transmission of a SSB in the same cell.

* * * * *